United States Patent [19]
Alpers et al.

[11] Patent Number: 5,816,455
[45] Date of Patent: Oct. 6, 1998

[54] METHOD AND APPARATUS FOR FROZEN DESSERT DISPENSING

[75] Inventors: Helmut A. Alpers, Gates Mills, Ohio; Jon P. Russett, Beloit, Wis.

[73] Assignee: Specialty Equipment Companies, Inc., Rockton, Ill.

[21] Appl. No.: 446,532

[22] Filed: May 19, 1995

Related U.S. Application Data

[62] Division of Ser. No. 250,043, May 27, 1994, Pat. No. 5,464,120.

[51] Int. Cl.$^6$ ............................................. G01F 11/00
[52] U.S. Cl. ................................. 222/388; 222/146.6
[58] Field of Search ............................. 222/146.6, 386, 222/388

[56] References Cited

U.S. PATENT DOCUMENTS

| | | | |
|---|---|---|---|
| 1,619,717 | 3/1927 | Gearhart . | |
| 1,704,784 | 3/1929 | Brubaker . | |
| 1,814,167 | 7/1931 | Laird . | |
| 1,930,037 | 10/1933 | Brubaker | 226/125 |
| 2,074,041 | 3/1937 | Baldwin | 221/102 |
| 2,337,161 | 12/1943 | Hessert | 226/23 |
| 2,517,234 | 8/1950 | Phelan | 62/99 |
| 2,534,782 | 12/1950 | Maddux | 222/80 |
| 2,559,840 | 7/1951 | Arthur | 222/61 |
| 2,631,761 | 3/1953 | Gates | 222/390 |
| 2,647,512 | 8/1953 | Johnson | 222/388 X |
| 2,781,953 | 2/1957 | Sylvander | 222/388 |
| 2,869,763 | 1/1959 | Bonvini et al. | 222/388 |
| 2,899,988 | 8/1959 | Stanley | 141/90 |
| 3,228,574 | 1/1966 | Patch | 222/559 |
| 3,698,206 | 10/1972 | Werner | 62/342 |
| 4,572,405 | 2/1986 | Miura | 222/14 |
| 4,693,397 | 9/1987 | Lang | 222/137 |
| 4,711,376 | 12/1987 | Manfroni | 222/146.1 |
| 4,978,042 | 12/1990 | Fidler | 222/642 |
| 4,995,876 | 2/1991 | Zollinger | 222/388 X |
| 5,048,724 | 9/1991 | Thomas | 222/95 |
| 5,150,820 | 9/1992 | McGill | 222/95 |
| 5,348,585 | 9/1994 | Weston | 118/305 |
| 5,398,643 | 3/1995 | McElrath et al. | 119/51.11 |

FOREIGN PATENT DOCUMENTS

| | | | |
|---|---|---|---|
| 452229 | 10/1949 | Italy | 222/386 |
| 241535 | 3/1946 | Switzerland | 222/386 |
| 2 230 057 | 10/1990 | United Kingdom . | |

Primary Examiner—Joseph Kaufman
Attorney, Agent, or Firm—Sonnenschein Nath & Rosenthal

[57] ABSTRACT

A frozen dessert dispensing apparatus is provided with a metering chamber having a predetermined volume into which a frozen dessert product is issued at a uniform constant rate from a bulk source. The time period required to fill the chamber volume determines a characteristic viscosity value of the dessert product which is advantageously used to time the flow of additional frozen dessert product from the source into and through the chamber to a selected point. The total time required to dispense a desired volume is based upon the viscosity measurement. A reciprocating piston arrangement provides gating of the frozen dessert product from the bulk source when in a first position and further acts to extrude frozen dessert product from the metering chamber when set in motion under the command of a controller. The piston arrangement includes a compressible plunger portion which deforms as necessary to prevent accidents or other mishaps from occurring in pinch-off regions of the apparatus.

3 Claims, 8 Drawing Sheets

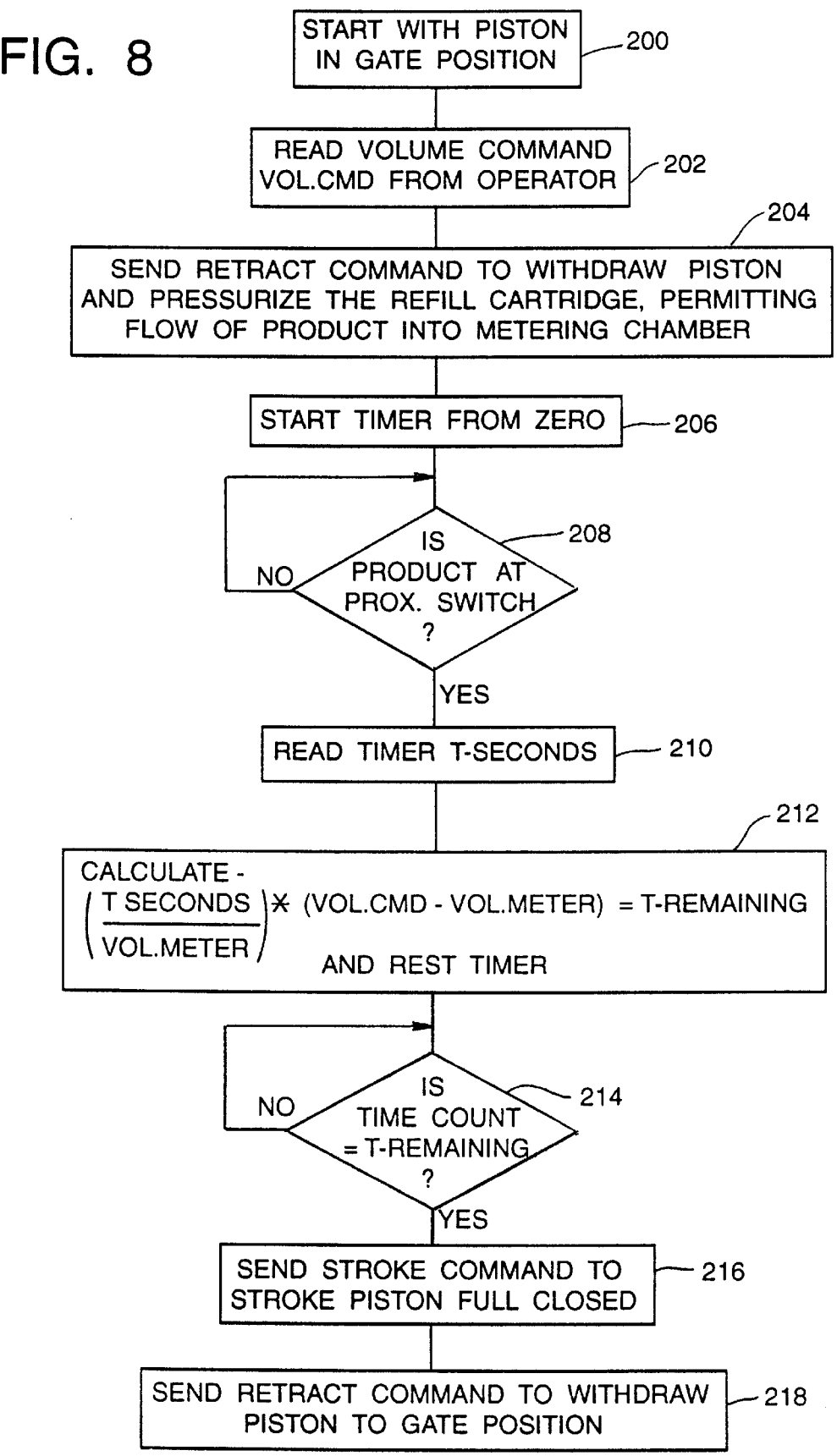

METHOD AND APPARATUS FOR FROZEN DESSERT DISPENSING

This is a divisional of the application Ser. No. 08/250,043, filed May 27, 1994, now U.S. Pat. No. 5,464,120.

BACKGROUND OF THE INVENTION

This application pertains to the art of dispensing frozen dessert products and, more particularly, to methods and apparatus for vending frozen dessert products in consumer selectable quantities.

The invention is particularly applicable to vending apparatus for unmanned sale of refreshments to consumers in malls, places of business, public places or the like and will be described with particular reference thereto although it will be appreciated that the invention has broader applications such as chemical mixing operations such in blending predetermined portions of different paint colors or any other procedures which require automatic fluid dispensing in user-settable quantities.

Frozen dessert dispensing apparatus have heretofore required a full time on-site operator or sales person to manipulate the apparatus in order to dispense various quantities of the dessert into a separate carton or edible cone. This human resource burden is largely due to the primitive valving mechanisms typically employed in soft ice cream and yogurt dispensers. Those valves are in reality a simple gate mechanism operable in a first position to block the flow of the frozen dessert product from a bulk supply and in a second position to permit said flow through a conduit and toward a dispensing head. As illustrated in U.S. Pat. Nos. 4,711,376 and 3,698,206, handles are typically connected directly to the gating mechanisms to provide a rather uncomplicated primitive dessert dispensing apparatus.

Devices of the type described above have become popular over the years but present two (2) major problems from a business perspective. First, an amount of human error is involved in determining the actual serving size. Although the various plastic and waxed containers used in connection with frozen dessert products of this type generally define a serving size, the actual precise amount of product served may vary. Oftentimes, product waste is involved or customers are over-served in the aggregate resulting as a business loss. Further, the costs associated with an on-site employee may be prohibitive. In certain settings, it is conceivable that insufficient demand exists for the soft frozen dessert products to warrant the expenditure of an operator's salary. In areas where sufficient demand exists, such as where a wide variety of products are sold at a common vending area such as a food court for example, the operator's time may be better served tending to the consumer's other needs rather than portioning frozen dessert products manually.

One solution is an automatic vending apparatus. These have been used in the past wherein a plurality of prepackaged frozen dessert products such as ice cream bars or ice cream sandwiches are sold directly to consumers. one downside of this approach is that the consumers are presented only with predetermined quantity choices.

U.S. Pat. No. 2,559,840 describes an ice cream dispensing device which is capable of issuing various selectable quantities of the frozen dessert product from a bulk storage container. However, the apparatus described in that patent is somewhat limited in that only multiples of a predetermined minimum quantity may be served. This is due to the fact that a fixed measuring chamber is repeatedly completely filled then completely emptied into a cup or the like to portion out ice cream from the bulk supply. Desired portions which are not multiples of the complete chamber volume are not serviceable.

Another apparatus for dispensing measured quantities of a frozen dessert product is described in U.K. Pat. Appln. 2,230,057. There, a complicated mechanism including a ram, valve and cylinder cooperate with a duct to divide a bulk supply of frozen dessert product into predetermined portions. One drawback with this system is its complicated nature and resultant disassembly and cleaning difficulties. In addition, spoilage may result because a considerable amount of product residue remains in the ram, cylinder and duct mechanism between uses.

Accordingly, it is clear that a need exists for a frozen dessert dispensing apparatus which is easy to use, simple to clean and maintain and which is capable of dispensing selectable quantities of the dessert product from a bulk source. The present invention contemplates new and improved methods and apparatus for frozen dessert dispensing which overcomes all of the above-referred problems and others and provides an apparatus and control method for use therewith which is simple, economical and profitable.

BRIEF SUMMARY OF THE INVENTION

In accordance with the present invention there is provided a free-standing self-contained soft frozen dessert dispensing apparatus capable of dividing bulk dessert into infinitely variable user-definable quantities over a continuous range.

In accordance with a more limited aspect of the invention, the frozen dessert dispensing apparatus includes a refrigerated main enclosure adapted to receive bulk frozen dessert product refill cartridges onto a dispensing head. The dispensing head is easily manually removable from the apparatus for easy cleaning. A piston within the enclosure engages the product cartridge on a first open end to apply a slight constant pressure thereto. The second end of the cartridge is adapted to be positioned on the dispensing head substantially within the refrigerated enclosure.

According to a still further aspect of the invention, the dispensing head includes an outlet nozzle, a cavity or product queue having a predetermined volume and a reciprocal plunger mechanism operable in the chamber. In a first position, the plunger permits frozen product to flow from the refill product cartridge and into the measuring chamber through an opening therebetween. The second position of the plunger substantially blocks the opening preventing further product flow from the bulk source.

In accordance with a still further aspect of the invention, plunger travel beyond that which blocks the flow of frozen dessert product from the bulk source induces an extrusion of the dessert product from the measuring chamber through the dispensing opening thus substantially completely evacuating the chamber of product.

In accordance with yet a further aspect of the invention, a method of frozen dessert product dispensing includes timing the interval required to fill the measuring chamber, permitting the frozen dessert product to flow from the bulk source and through the measuring chamber for a second time period and lastly completely purging the measuring chamber of the dessert product after the second predetermined time period in order to dispense a user-settable product quantity.

The principle object of the invention is to dispense user-definable quantities of a frozen dessert product to achieve portion control in an apparatus which is uncomplicated, easy to clean and maintain, and operates inexpensively.

Another object of the present invention is to provide a method of operating a soft frozen dessert dispensing apparatus which facilitates easy control thereover. The method includes sensing that the measuring chamber is completely full, determining a second time period for continued flow of frozen dessert product through the chamber from a bulk source and operating a plunger to substantially completely purge the measuring chamber. The step of determining the time period required to fill the chamber can be eliminated when the chamber defines the desired quantity of dessert.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE DRAWINGS

Figure 1:
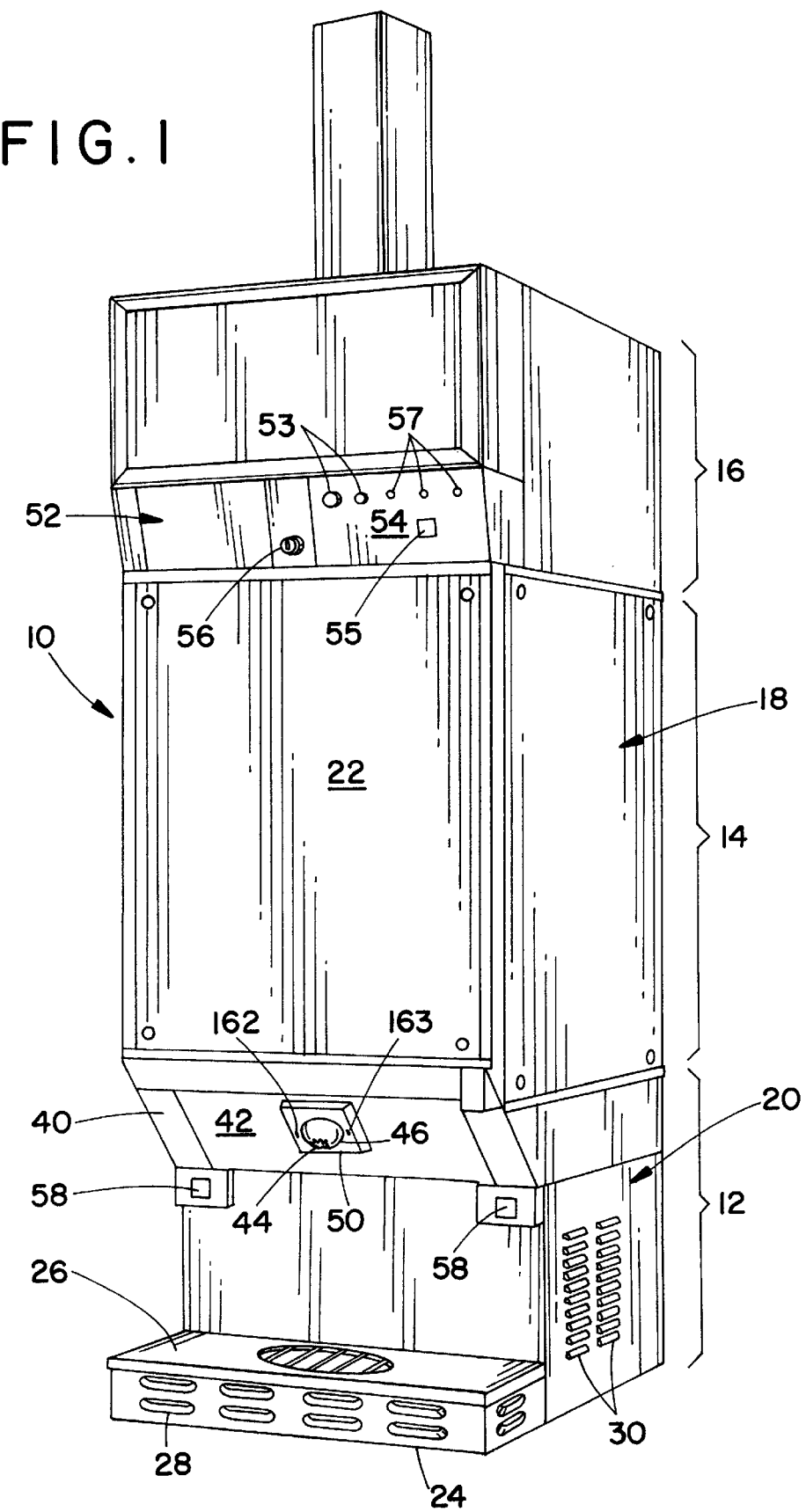
FIG. 1 is a perspective view of a frozen dessert dispensing apparatus embodying the present invention.

Referring now to the drawings wherein the showings are for the purposes of illustrating the preferred embodiments of the invention only and not for the purposes of limiting same, the figures show a frozen dessert dispensing apparatus 10 including a dispensing station 12, a bulk product section 14 and an interface and control section 16.

With reference first to FIG. 1, the frozen dessert dispensing apparatus 10 includes a substantially rectangular refrigerated cabinet 18 which sits atop a reinforced pedestal 20. The refrigerated cabinet 18 includes a front face surface 22 which may be lettered, brightly illustrated or provided about its periphery with suitable channel members for supporting replaceable cardboard or plastic product advertisements, operator instructions or the like. In the preferred embodiment, a plurality of thumb screws are used to secure the panels to the cabinet. At least one of the flat panels illustrated in the figure comprising the cabinet 18 are adapted to provide easy access into the cabinet by authorized personnel for purposes such as to replace depleted frozen dessert stock. In the preferred embodiment, the front panel facing the operator pivots on hinges (not shown) and is optionally equipped with a lock to prohibit unauthorized access. An edge of the front panel closes a normally open magnetic safety interlock switch (not shown) when the panel is pivoted into a closed position sealing the cabinet 18. All power is removed from the device when the door is opened.

The pedestal 20 of the dispensing station 12 includes a substantially square bottom portion defining a solid base 24.

The apparatus 10 is thereby suitable for placement onto a support table or countertop in a store or the like. A work surface 26 is defined by the general "L" shape of the pedestal 20 and may include a drip tray (not shown) such as is typical in the dispensing apparatus art.

The various hardware necessary to accomplish the refrigeration of the cabinet 18 including a compressor, condenser and condenser fan are all housed within the pedestal 20. Since these components are heavy, their location within the pedestal adds to the overall stability of the apparatus 10. To provide ventilation thereof, a plurality of vent openings 28 are suitably arranged on the face of the pedestal 20 while a second set of vent openings 30 are arranged on first and second (not shown) sides of the base as well. One or more groups of these vent openings may be combined to cooperate providing flow through ventilation for the air-conditioning hardware housed within the base 24. Vents may also be added to the rear panel of the pedestal (not shown). Since it is undesirable that heat may migrate upward from the base 24 towards the refrigerated cabinet 18, proper heat management, such as through use of fans and vents, is critical.

Figure 3:
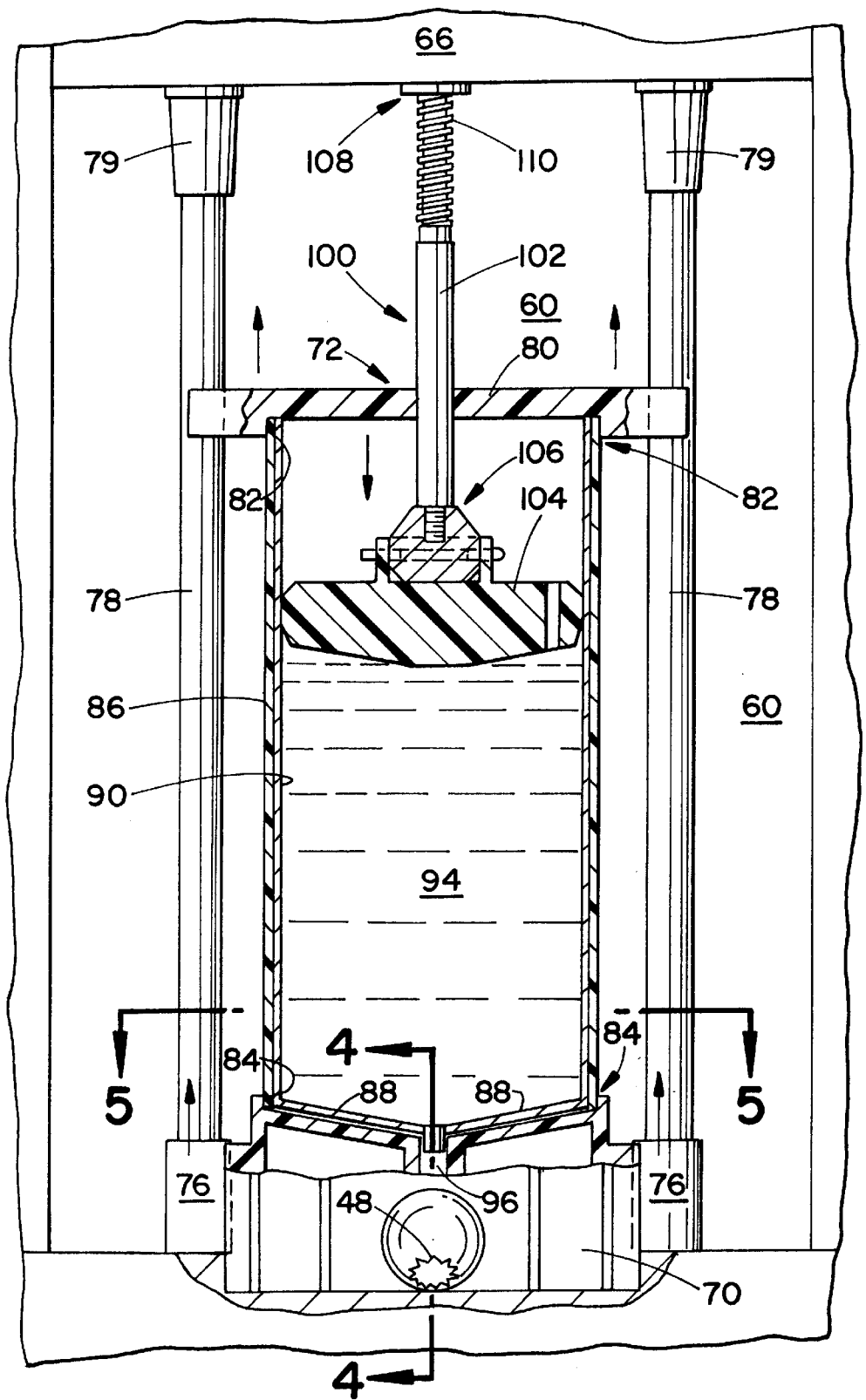
FIG. 3 is a view of the broken away portion of FIG. 2 in partial cross section.
Figure 4:
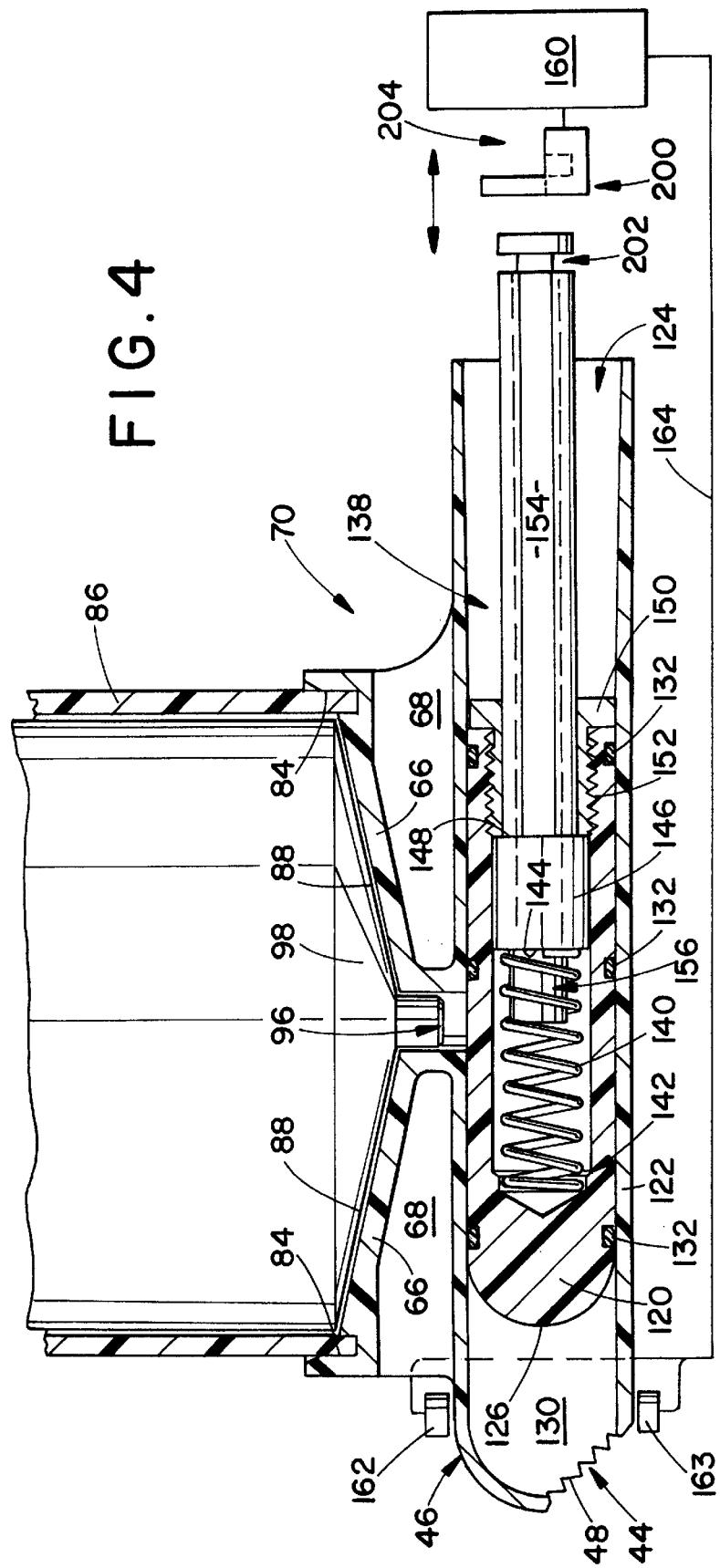
FIG. 4 is a cross-sectional view of the dispensing apparatus taken along line 4—4 of FIG. 3.

With continued reference to FIG. 1, the dispensing station 12 includes a product discharge 40 disposed on an interface surface 42 between the refrigerated cabinet 18 and the pedestal 20. This surface is set at an angle to the front face surface as illustrated in order to provide easy operator access to the product discharge 40. The interface surface 42 cooperates with the work surface 26 to provide a handy area within which to position and fill a product container such as a cup, edible cone or dish. During a product dispensing operating mode of the apparatus, the frozen dessert product exits the refrigerated cabinet 18 through an opening 44 provided in an outlet nozzle 46. A plurality of teeth or serrations 48 are arranged about the periphery of the generally circular opening 44. This is best illustrated in FIGS. 3 and 4. A suitable escutcheon 50 is provided primarily for aesthetics although some insulation and support for the outlet nozzle 46 is thereby provided. The escutcheon 50 also provides support for an infrared transmitter and receiver pair for sensing the dessert product flowing out from the opening 44. In the preferred embodiment, the infrared sensor pair are completely encased by the escutcheon 50 in order to protect the sensor pair from contamination due to contact with the dessert product. The escutcheon 50 is made of a plastic material having suitable infrared transmissive properties to enable the sensor pair to cooperatively sense, through the plastic, dessert product flowing between the pair.

A pair of illuminated push buttons 58 are disposed on the pedestal and electrically connected to controller apparatus housed within the interface and control section 16. The left push button as viewed in the FIG. selects a "regular" size or portion of dessert product while the right push button is used to select a "large" portion In addition to the front face surface 22 and the product discharge area 40, the frozen dessert dispensing apparatus 10 includes an operator command region 52 including a control panel 54 and a keyed access closure 56. In the preferred embodiment, the control panel 54 is hinged to the interface and control section 16 using suitable hinges and techniques well known in the art. A pair of push buttons 53 are disposed on the control panel and electrically connected to the control apparatus housed within the interface and control section 16 as will be discussed in greater detail below. The push buttons 53 offer cycle initiation options to an operator for changing spent product refill containers with full containers. The left push button of the pair 53 initiates a MANUAL RETRACT operation which retracts a piston used to pressurize the refill cartridge. The right push button of the pair 53 initiates a TUBE READY operation. This operation first drives the piston into the full refill cartridge, then pressurizes the cartridge to a slight standby operating pressure. The pressure is increased when the dessert is being dispensed.

Three indicator lights and a numeric display 55 are also disposed on the greater command region 52 of the interface and control section 16. From the left as viewed in the Figure, the lights 57 indicate a DEFROST cycle, a SOLD OUT condition and a LOAD TUBE condition respectively. The numeric display 55 is a two (2) digit segmented display for presenting the temperature within the refrigerated cabinet 18 derived from a thermocouple signal to an operator. The display 55 also functions to alert the operator in the event of a plurality of failures or error conditions discussed in greater detail below. The indicator lights 57 are illuminated to provide convenient visual indicia of the operating cycle or mode of the dispensing apparatus.

Figure 2:
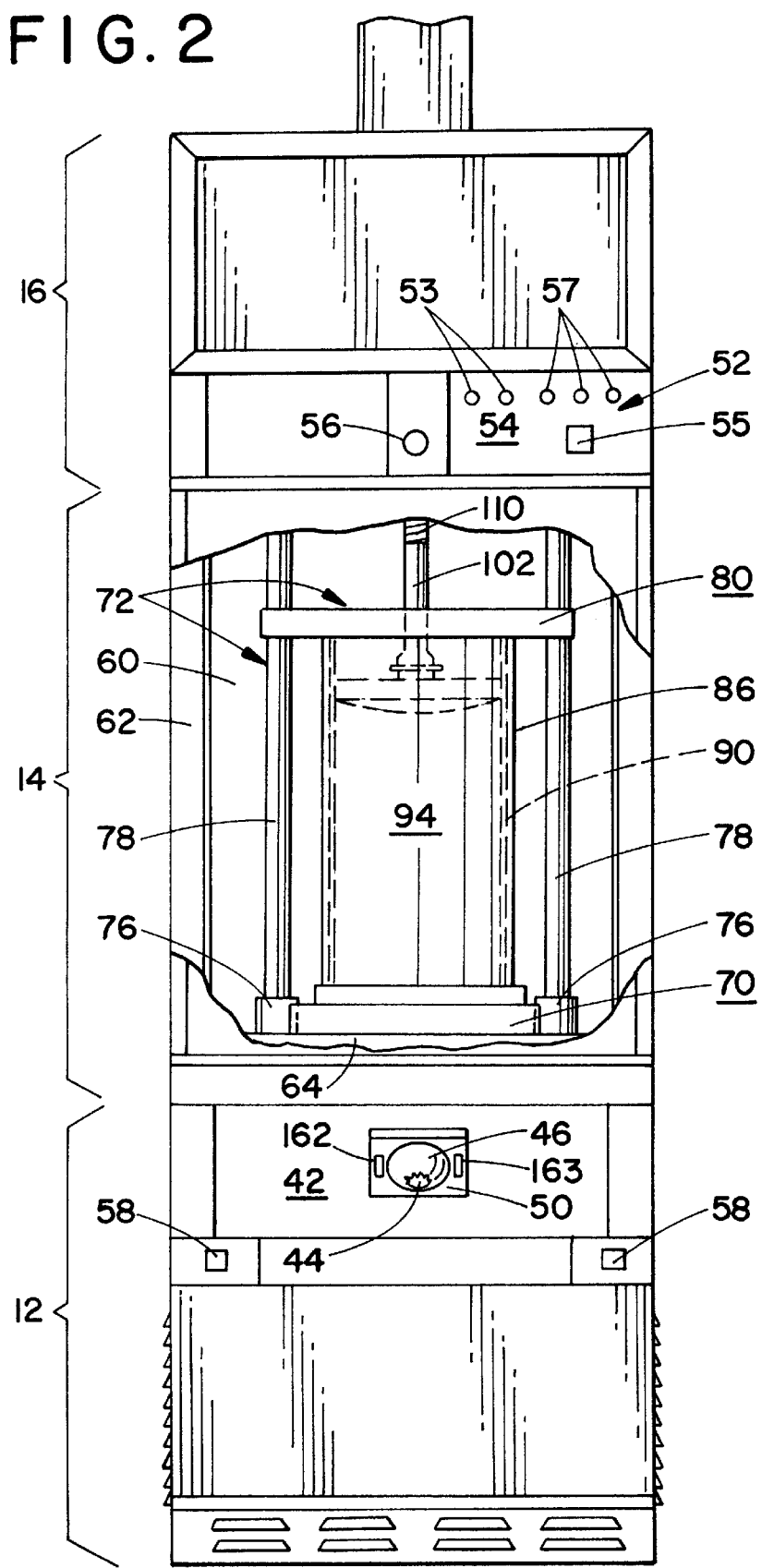
FIG. 2 is a front elevational view, partially broken away, of the dispensing apparatus illustrated in FIG. 1.

The refrigerated cabinet 18 includes a cooled region 60 as best understood with reference to FIGS. 2 and 3. The walls 62 of the refrigerated cabinet 18 are suitably provided with adequate insulation to discourage migration of heat into the bulk product section 94.

A horizontal support member 64 provides a rigid mount for a rigid dispensing head member 70 shown in FIGS. 2–5 but best illustrated in FIG. 4. The horizontal support member 64 and manually removable dispensing head 70 form the bottom portion of a frame structure 72 adapted to receive frozen dessert product refill cartridges 74 thereon.

Figure 5:
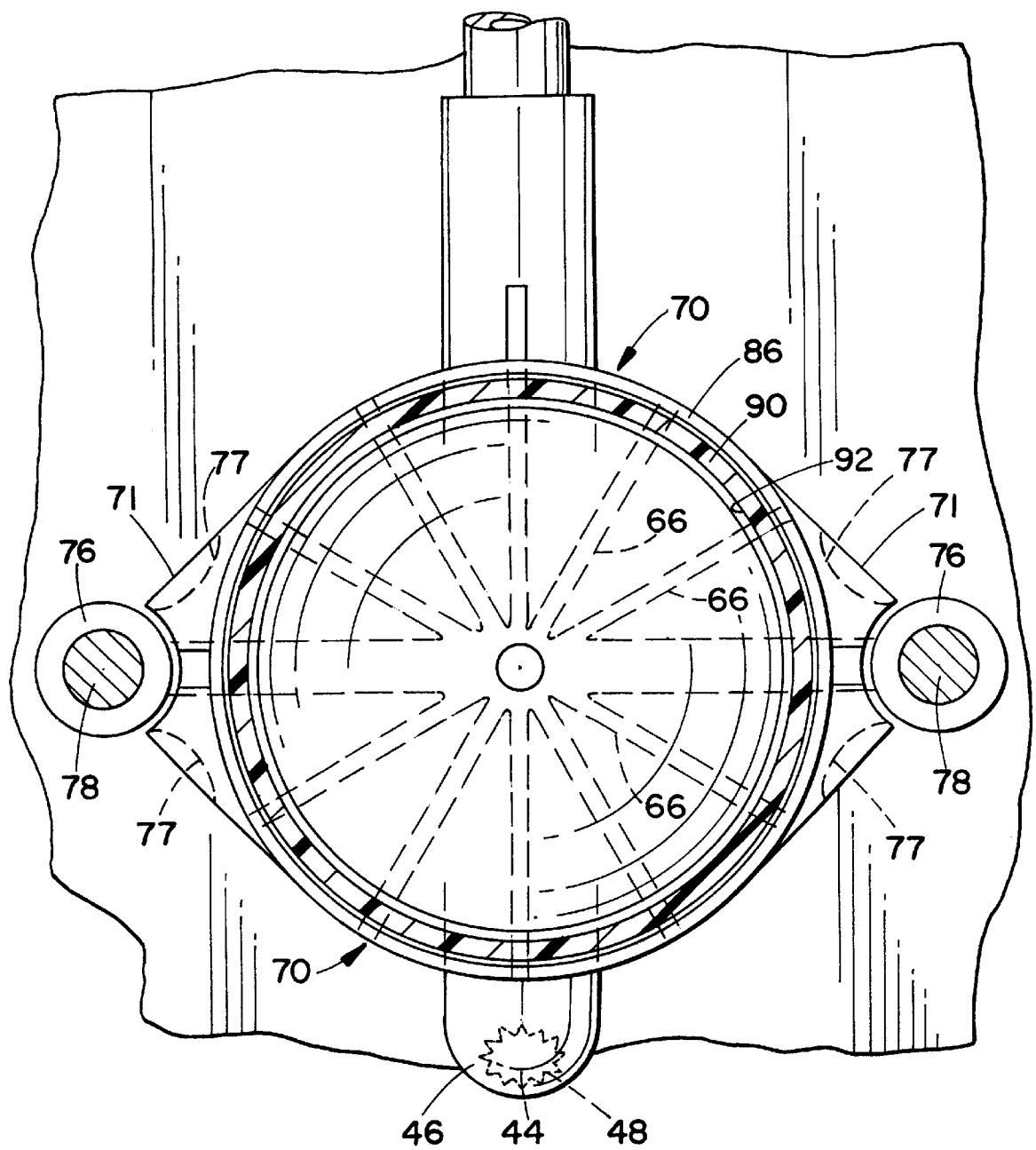
FIG. 5 is a cross-sectional view of the dispensing apparatus taken along line 5—5 of FIG. 3.

The dispensing head 70 includes shoulder portions 71 shaped to mate with or otherwise engage a pair of slidable lock members 76 as best shown in FIG. 5. The lock members are adapted to slide vertically on a corresponding pair of guide members 78 (FIG. 3). Although only two (2) guide members and shoulders are illustrated in the preferred arrangement, obviously three (3) or more of each may be used to accomplish the same result which will be described below. In the position illustrated, the lock members hold the dispensing head in place.

The top of the frame structure 72 includes a horizontal cap member 80 adapted to slidingly engage the guide members 78 for vertical movement of the cap movement thereover. The vertical guide members 78 are slightly enlarged at their top portions to define friction grip portions 79 which engage and fictionally hold the cap member 80 at the top of the cooled region 60 to facilitate removal of the head member 70. A pair of substantially circular grooves 82, 84 defined in the cap member 80 and dispensing head 70 respectively, cooperate to receive and support a substantially cylindrical rigid sleeve or pocket member 86 therebetween.

The pocket member 86 is of sufficient diameter to closely receive a bulk dessert refill cartridge 90 therein. The refill cartridge 90 may be a waxed cardboard or plastic cylinder containing a fresh supply of a frozen dessert product 94 therein. In the preferred embodiment, the refill cartridge 90 holds about 1.5 gallons of frozen yogurt. A fluid tight interface between the cartridge 90 and the dispensing head 70 is maintained by a plastic end cap 88 attached to the pocket member 86. The end cap 88 has an opening for the flow of product into the head. This is best illustrated in FIGS. 3 and 4.

With continued but particular reference to FIG. 3, the cap member 80 slidably engages not only the guide members 78 but also a reciprocating plunger assembly 100. More particularly, an opening is defined in the cap member 80, the opening being large enough to permit the free travel of a lead screw 102 of the plunger assembly 100 to rotate and slide therein. The lead screw 102 is connected to a piston head 104 through a bearing block 106. The bearing block 106 permits free rotation of the lead screw 102 without inducing a corresponding rotation at the piston head 104. The piston head 104 is formed of a semi-rigid compound such as a hard rubber so as to engage the inner walls 92 of the refill cartridge 90. As the piston 104 engages the inner wall 92 and is forced downward as viewed in FIG. 3, the frozen dessert product 94 within the refill 90 is urged from the container through an opening 96 provided in the dispensing head 70. Alternately, the refill cartridge 90 may be formed with an integral piston adapted to slidably engage the walls of the cartridge as well as moving piston 104. Other combinations well known in the art are also possible.

The upper ends of the guide members 78 are fixed to and held spaced apart by a second horizontal frame member 66 which also provides support for a pillow block 108 comprising part of the plunger assembly 100. The pillow block engages the lead screw at a threaded interface 110 and is held in a spatially fixed location by the second frame member 66. Accordingly, as the lead screw 102 is rotated by an electric torque motor (not shown), the lead screw and piston 104 attached thereto is advanced downwardly as illustrated in FIG. 3. The frozen dessert product 94 is thereby compressed within the refill cassette 90 constrained to expand only as far as permitted by the rigid tubular pocket member 86. The electric torque motor (not shown) driving the lead screw 102 is operated in the preferred embodiment only when there is a need to dispense the product. The frozen dessert product 94 is maintained within the frozen dessert dispensing apparatus 10 under normal atmospheric pressure until a constant and predefined pressure for ready dispensing thereof is necessary. In the preferred embodiment discussed below, the product is pressurized two (2) seconds after a draw valve is commanded to retract. Further, a look up table is used to tailor the pressure on the product based on the quantity of product remaining in the cylinder.

The details of the frozen dessert dispensing head 70 will next be discussed with particular reference to FIGS. 3–5. As indicated above, the tubular pocket member 86 along with a corresponding end cap 88 is received into an annular groove 84 of the dispensing head 70 providing a fluid tight coupling therebetween. A centralized opening 96 in the head permits the free flow of frozen dessert product 94 from the refill cartridge 90 when the draw valve 120 is in the fully retracted position. The dispensing head 70 includes a dish contour 98 formed between the opening 96 and the annular groove 84 to encourage the flow of frozen dessert product 94 toward the centralized opening 96. A plurality of reinforcement ribs 66 extend radially from the opening 96 to increase the rigidity of the dispensing head in the dish portion 98. An interstitial void or airspace 68 is created by the separation between the reinforcement ribs 66 and the structure supporting the draw valve 120. This void or airspace is advantageously used in the frozen dessert dispensing apparatus 10 to provide additional insulation to the frozen dessert product 94 within the refill cartridge 90. The dispensing head may be formed of a unitary solid construction. Finger grip detents 77 are disposed in the head to facilitate easy manual removal thereof for cleaning or the like.

As best illustrated in FIG. 4, the draw valve 120 is slidably received within an elongate cylinder 122 extending from a first open end 124 to a second end a concave inner wall surface through which is formed the outlet nozzle 46. When in a fully retracted position, as schematically represented in FIG. 7b, the draw valve uncovers the opening 96 permitting the frozen dessert product 94 to freely flow therethrough and into a metering cavity 130 defined by the portion of the cylinder 122 forward of the plunger end 126 of the draw valve 120. The metering cavity acts as a type of product queue in a manner to be described in greater detail below. At the other extreme end of travel, that is in the fully extended position, the convexly shaped plunger end 126 of the draw valve 120 engages the inner surface of the end wall that carries outlet nozzle 46. This is schematically represented in FIG. 7e. Motion of the draw valve 120 in the forward direction or to the left as viewed in FIG. 4 from the fully retracted position extrudes measured amounts of frozen dessert product from the metering cavity 130 and through the opening 44 in the outlet nozzle 46. The serrations 48 surrounding the opening 44 give the extruded frozen product a fanciful design appearance. A plurality of circumferential O-rings 132 are seated in grooves and provide a fluid-tight seal between the draw valve 120 and the cylinder 122.

Since it is possible that an operator may inadvertently insert a body part, such as a finger, into the serrated opening 44 during forward motion of the draw valve 120, a compression spring 140 having a predetermined spring constant communicates the forward motivating force from a prime mover 160 to the draw valve 120. The spring constant is selected so as to preclude a pinching off of the body part which may come to be squeezed between the plunger 126 and outlet nozzle 46.

With continued reference to FIG. 4, the compression spring 140 is held slightly compressed between a spring pocket 142 formed in the draw valve 120 and a forward face 144 of a draw valve shoulder 146 formed on a draw valve plunger 138. A rearward face 148 of the draw valve shoulder 146 engages a draw valve cap 150 which threadedly engages internal threads 152 formed in the draw valve 120. The draw valve cap 150 has a central opening therethrough of sufficient diameter to accommodate an elongate connecting portion 154 of the draw valve plunger 138. Similarly, the draw valve shoulder 146 has an outer diameter sufficiently sized to loosely fit within the draw valve 120 so as to axially slide therein against the force of the compression spring 140. A spring guide member 156 engages the compression spring 140 to maintain the spring centered within the draw valve 120 and in square contact with the forward face 144 of the draw valve shoulder 146.

The connecting portion of the draw valve mates with a prime mover at a connection coupling 200. When the head 70 is manually placed on the frame member 64, a circumferential groove 202 on the connection portion 154 engages a fork connector 204. The fork connector moves with the prime mover in a manner discussed below.

Lastly, with respect to the dispensing head 70 of FIG. 4, an infrared transmitter and receiver sensor 162, 163 is provided on the escutcheon 50 near the opening 44 for sensing the presence of frozen dessert product flowing through the opening. An indication of the presence of product at the sensor in the position illustrated indicates that the metering cavity 130 is completely full of dessert product. The sensor pair 162, 163 is connected to the prime mover 160 on an electrical signal wire 164 in order to communicate power and logical signals therebetween.

Figure 6:
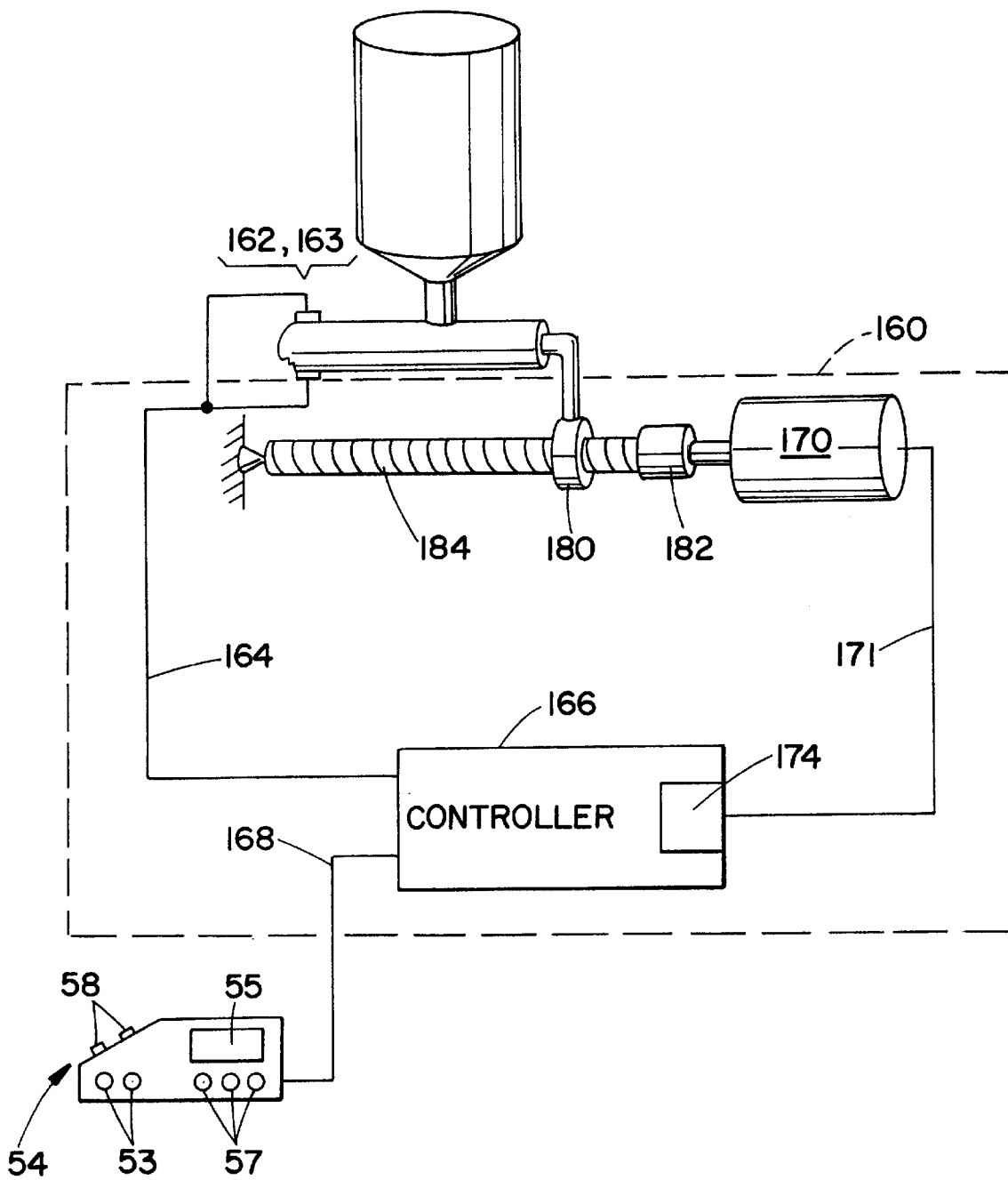
FIG. 6 is an electrical block diagram illustrating the logic and control elements of the dispensing apparatus.

FIG. 6 illustrates a first preferred embodiment the prime mover and dispensing head assembly schematically. In general, the prime mover 160 comprises an electronic controller 166 which includes a microprocessor, memory, and buffering in order to perform the various logical and motivational tasks described in greater detail below. Electronic controllers are readily available, fully configured to support a wide range of applications, the only customization necessary being the generation of appropriate control software to follow the procedures set forth below. In the preferred embodiment, the controller includes a universal controller manufactured by Taylor and is identified by their part number X47575. The interface board is also manufactured by Taylor as part number X47573-12.

The electronic controller 166 is connected to the sensor pair 162, 163 via a signal wire 164. In addition, the controller 166 is further connected to the pushbuttons 53 on the control panel 54 and the illuminated push buttons 58 on the pedestal 20 via a control panel wire bundle 168.

A stepper motor 170 is directly connected to a stepper motor drive circuit 174 within the electronic controller 166. A suitable arrangement of stepper motor drive wires 171 carries the logical power signals from the drive circuit to the stepper motor. A gear box 180 amplifies the torque generated in the stepper motor in order to actuate a pillow block 182 which threadedly engages a lead screw 184. The draw valve plunger 138 is connected to the pillow block 182 and moves therewith according to the rotation of the stepper motor under the direction of the controller 166.

A second preferred embodiment of the prime mover includes a D.C. motor connected to the lead screw 184 through a dog clutch responsive to changes in the direction of rotation of the lead screw. The components of this second preferred embodiment perform the same basic functions as the components illustrated in FIG. 6 and, therefore, no separate Figure will be referred to or presented.

The dog clutch is annular in shape and includes threads on the inner circular surface thereof adapted for engagement with the threads of the leadscrew 184. The outer circular surface of the dog clutch defines a radially extending key member which is adapted to slidably engage a corresponding keyway groove disposed in the dispensing lead 70. The keyway groove extends longitudinally generally along the axis of the metering cavity 130 and draw valve travel.

Using the above specified components, the draw valve 120 is caused to move along the axis of the metering cavity until reaching the extreme ends of travel in either the advance of retract positions. At those extremes, the rotation of the D.C. motor no longer causes motion of the valve due to the "snap off" action of the clutch. The lead screw turns freely within the clutch. Upon reversing rotational direction of the motor, the clutch once again re-engages thus converting rotation of the lead screw into linear motion of the draw valve.

A first preferred method of operating the frozen dessert dispensing apparatus according to the present invention will next be discussed with reference to FIGS. 7a–7e and 8 and based upon the apparatus set forth in FIGS. 1–6 above including the first preferred prime mover device.

Figure 7A:
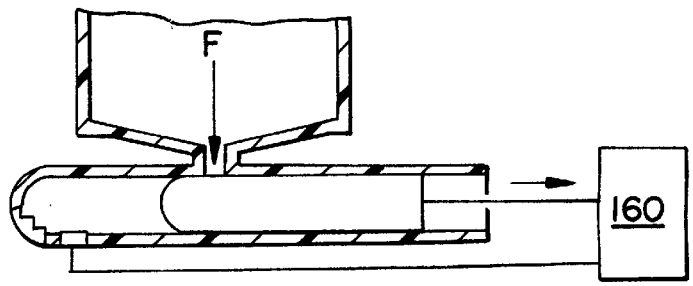
FIGS. 7a–7e illustrate a sequence of operating the apparatus of FIGS. 1–5 to dispense frozen dessert portions in variable predetermined quantities; and, FIG. 8 is a flow chart setting forth a preferred method of dispensing variable predetermined quantities from the apparatus of FIG. 1.
Figure 7B:
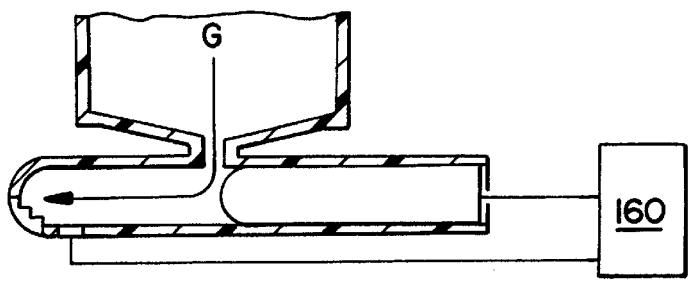
Figure 7C:
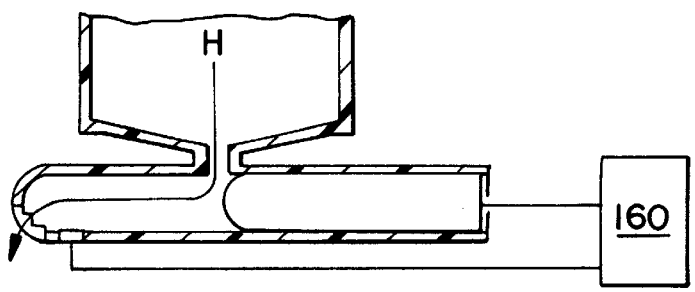

Initially, the draw valve 120 is held in the position (step 200) illustrated in FIG. 7a. This is referred to as the GATE position because the flow of frozen dessert product F is blocked by virtue of the draw valve covering the opening 96. With the valve in the GATE position, the controller 66 reads the volume command from the pushbuttons 58 on the pedestal 20 (step 202). The inputted command will be referred to as $VOL_{cmd}$.

Although the preferred embodiment includes a pair of pushbuttons 58 to set a command volume, through simple modification, a thumbwheel switch or dial may be used as an input device to command volumes of various sizes from a range of valves.

Next, a retract command is issued from the electronic controller to the stepper motor 170 to withdraw the valve and pressurize the product refill cylinder permitting the metering cavity 130 to fill with the frozen dessert product (step 204). The position illustrated in FIG. 7b is referred to as the RETRACT position. As soon as the valve reaches the RETRACT position, a timer is started to count from zero (step 206). The counter is permitted to increment while the electronic sensor pair 162, 163 is continuously monitored by the electronic controller 166 in order to detect as quick as possible the presence of the frozen dessert product at the opening 44 (step 208). FIG. 7b illustrates the flow G of dessert product through the opening and toward the sensor.

Once the sensor detects the presence of dessert product at the opening, the timer value is read (step 210). The time to completely fill the metering cavity 130 is $T_{seconds}$.

Since the metering cavity is of a predetermined volume, the time required to fill that volume with frozen dessert product is used advantageously to indirectly calculate a relative viscosity index of the dessert. More precisely, the flow rate through the opening 96 is known given the volume $VOL_{meter}$ of the metering cavity 130 and the time $T_{seconds}$ necessary to fill that volume. In the special case that the volume of the metering cavity is selected to match the minimum command volume, or "small" serving size, no flow rate calculation is necessary.

At this point in the cycle, the valve is maintained in the RETRACT position while the frozen dessert product is permitted to flow H through the metering cavity and opening into a suitably positioned cup or container below the outlet nozzle 46. The timer is immediately reset and permitted to once again count up. The time that the draw valve is to be held in the RETRACT position is calculated (step 212) according to:

$$(T_{seconds}/VOL_{meter})*(VOL_{cmd}-VOL_{meter})=T_{remaining}.$$

Figure 7D:
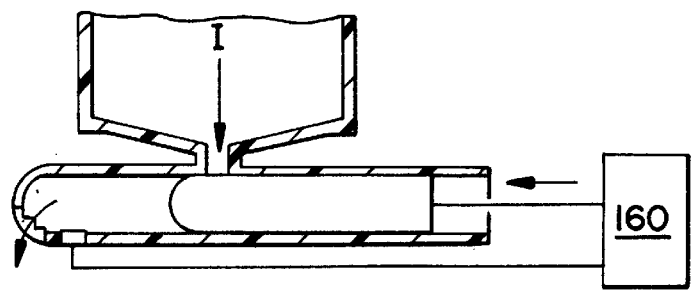
Figure 7E:
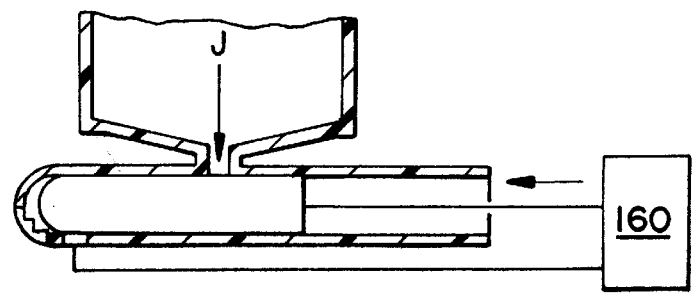

When the time reaches the calculated remaining time $T_{remaining}$ (step 214), the draw valve 120 is commanded to traverse its entire stroke (step 216) by the electronic controller to first pinch off the opening 96 blocking flow I from the bulk supply as shown in FIG. 7d to a fully extended position extruding the product in the metering cavity completely as shown in FIG. 7e.

In the event that the opening 44 adversely affects the overall flow rate through the chamber, a delay time period must be added to the calculated remaining valve. The delay time period is empirically derived and programmed into the controller 166. The delay is based on the physical construction and size of the opening 44 and the resultant flow rate therethrough.

The draw valve 120 "knows" when to stop since the stepper motor 170 undergoes angular displacement responsive to the number of pulses issued by the drive circuit 174 within the controller 166. The electronic controller is programmed to issue only the amount of pulses necessary to fully stroke the draw valve. Also, the controller is programmed to issue the pulses in the proper logical sequence in order to obtain left and right actuation of the draw valve through the stepper motor and lead screw combination. After the draw valve has reached its fully extended position, as best shown in FIG. 7e, blocking the flow J of bulk frozen dessert product, a RETRACT command is issued from the drive circuit 174 to the stepper motor to withdraw the draw valve (step 218) to the GATE position shown in FIG. 7a.

When the second preferred prime mover system is implemented to perform the above-described method, the D.C. motor is command to rotate for predetermined time periods causing the draw valve to similarly react or extend. The time periods are selected to be long enough to ensure that full travel is realized. As described above, the draw valve is effectively divorced from the lead screw at the extreme ends of travel through the action of the dog clutch.

Operational Description

The extruder control consists of a control, an interface, a display board, and a motor power supply. All of these boards are required to control the refrigeration, dispensing, and retracting systems.

Cabinet Temperature

The refrigeration control of the control system maintains cabinet temperature between 5° F. and 15° F. by monitoring the cabinet thermistor. When the cabinet temperature reaches 15° F., the compressor is turned on until the cabinet temperature drops to 5° F. A heater is selectively used in combination with the refrigeration compressor to aid in tempering the cabinet should the temperature drop below 5° F. The evaporator fans remain on at all times except when the cabinet door is open or during a defrost cycle. The cabinet temperature is continuously displayed on a two-digit, seven-segment display 55 in an absence of system errors. A failed thermistor, motor current failure, or sensor failure constitutes a system error. The condenser fans are hard-wired to line voltage and remain on at all times. An operator accessible potentiometer (not shown) on the unit determines what temperature range the cabinet will be controlled in. If the potentiometer is turned to the far left, cabinet temperature is controlled between 20° and 30° F. If the potentiometer is turned completely right, the cabinet temperature is controlled between 0° and 10° F.

Defrost Cycle

The unit selectively enters a defrost cycle every 6 hours. The defrost cycles occur at 3:00 a.m., 9:00 a.m., 3:00 p.m., and 9:00 p.m. Once in defrost, the defrost indicator illuminates and the unit enters the heating phase of the cycle. In this phase the compressor and evaporator fans turn off and the heater turns on. When the defrost thermistor reaches 50° F. or the heater safety timer expires, the heater is turned off and the soak out timer starts. When this timer times out the compressor is turned on again. When the defrost thermistor detects a temperature below 30° F., the evaporator fans are turned on and the defrost cycle is then complete. The defrost indicator turns off at this point. The compressor remains on until the cabinet thermistor registers a temperature of 5° F., provided the cabinet thermistor has not failed. The control once again starts cycling the compressor, based on the cabinet thermistor reading, to control the temperature between 5° F. and 15° F. The display registers the temperature of the cabinet based on the defrost thermistor readings. During regular refrigeration, the cabinet temperature displayed is that of the cabinet thermistor readings.

Heater Safety Timer

A fifteen (15) minute timer begins whenever the heater is turned on and is reset when the heater is turned off. If this timer times out, the heater is turned off immediately to prevent an unsafe condition. No error codes are displayed and the unit enters the "soak out" phase of the defrost cycle.

Failed Cabinet Thermistor

The control has the ability to detect a bad thermistor. If the cabinet thermistor appears to be opened or shorted, the control cycles the compressor at a fixed rate and flashes an error code "88" on the display 55. In the event of a failed cabinet thermistor, the operator remains able to dispense the remainder of the product in the tube. When the tube is sold out or if the piston is manually retracted the piston retracts as usual. However, once the piston is fully retracted, the actuator is locked out until the thermistor is replaced or repaired and cabinet temperature can be monitored again. This allows the customer to sell product while waiting for service, but prevents the operator from continually using a malfunctioning unit. The unit still goes through defrost cycles as in normal operation.

Failed Defrost Thermistor

If the defrost thermistor appears to be opened or shorted, the unit continues refrigerating as usual and an error code "77" flashes on the display 55. The unit skips defrost cycles until the thermistor is replaced or repaired. As with a failed cabinet thermistor, the operator remains able to dispense the remainder of the product in the tube. When the tube is sold out or if the piston is manually retracted, the actuator is locked out until the problem is solved.

Door Switch

When the door of the cabinet is opened all outputs, including the door light are shut off or disabled except for the defrost heater. If the unit is going through the heating phase of the defrost cycle and the door is opened, the heater remains on. If the cabinet is refrigerating and the door is opened, the compressor and the evaporator fans shut off until the door is closed. As a safety feature, if the dispensing motor and/or the draw valve are running when the door is opened, operation is suspended until the cabinet door is closed. If the door is opened during a draw cycle, the portion size will not be within a specification. The draw should be terminated when the door is opened and closed.

Actuator Control

SERVE, RETRACT and PRELOAD are the three modes of actuator operation are described above. The SERVE mode is used for maintaining and dispensing servable product. The RETRACT mode is used for returning the actuator to the HOME position to permit product tube replacement and does not allow product delivery. The PRELOAD mode is used for automatically placing the piston in the appropriate location for product dispensing in the SERVE mode.

Dispensing Product

In the serve mode, when the small (or large) draw switch 58 is pressed, the draw valve slide motor is activated open. After a 2 second delay, (called the actuator on delay) the dispensing motor is turned on at dispensing speed to pressurize the product in the refill cartridge. It will remain on until the control has determined that enough product has been dispensed (see "PORTION CONTROL" for further information). Then the draw valve slide motor is activated in the closed direction. If during a draw, the full extension switch is hit and the dispensing motor current overloads, the control presumes the product tube is empty and enters the Retract mode. However, if the motor current overloads, and the full extension switch is not active, the control assumes there is an overload, flashes the sold out light, and enters the Retract mode.

Portion Control

The portion control sensors 162, 163 are located inside the spout guide cover 50. When the product passes through the sensor path, a signal is sent to the control indicating product has been sent. For a 5 oz. portion, when the sensor "sees" product, the draw is terminated. For any other size portion (large), the universal control runs a calculation, based on the time it takes to sense the product, to determine how much longer the draw should continue.

Sensor Failure

For any size draw, if no product is sensed fifteen (15) seconds after the draw switch is pressed, the draw should automatically be terminated. An error code "55" will flash at ½ second intervals on the display 55. If the sensors 162, 163 detect product two (2) seconds after the draw switch 58 is pressed (after actuator on delay), the draw is terminated and the error code "55" is displayed. If there is a sensor failure, serving will still be permitted and there is no actuator lockout when the product tube is sold out or the piston retracts. A sensor failure could occur if the sensor area on the spout is dirty. When a successful draw is completed, a draw in which the sensor detects product within the appropriate time frame, the display will once again indicate cabinet temperature.

Retract Mode

If the product tube is presumed empty, the manual retract switch is pressed, or a system error occurs, the control enters the Retract mode. Once this mode is entered, the control reverses the piston direction at full speed until the piston is fully retracted. At this point the control waits for the door switch to open and close again, and the preload switch to be pressed to indicate that a tube has been replaced. Once this occurs and there are no system errors present, the Preload mode is entered.

Preload Mode

This mode is used to extend the dispensing actuator at full speed until it reaches a preset load. When the preload mode is initiated the load tube light shuts off. The sold out light remains lit during preload. When the preload current is reached, the actuator motor is shut off. The motor current is a function of the pressure on the actuator. The control is now in the serve mode, and the actuator is in position to deliver product. This feature permits immediate product dispensing on the first draw off a new tube. If for some reason a tube is removed but another is not put in, the motor continues moving forward at full speed until the full extension switch is reached. The Retract mode is then entered. The draw switch is inactive in the Preload mode of operation.

Motor Current

The control measures the actuator motor current to estimate the pressure on the actuator. When the full extension switch is open in the Serve mode, if the current exceeds the specified overload current the control should flash the sold out light and switch modes to the Retract mode. The actuator should reverse down until the full retraction switch is closed. To remove the error, replace the product tube with properly tempered product. Note that there should be no nuisance overloads because the control does not rely on a fuse. If no motor current is measured at any time when the actuator should be operating, the actuator is shut off and an error code "66" is flashed on the seven-segment display.

Sold Out Light

In the Serve mode, when the full extension switch on the actuator closes and a current overload occurs, the sold out light illuminates. This light will remain on until retraction, and preload are completed. If there is a motor current overload, the sold out light should flash. The light will flash during retraction and until the preload mode is entered. When the preload mode is entered, the light will stay on solid. In general, any time this light is on or flashing, product can not be dispensed.

Load Tube Light

In the Retract mode, this light illuminates when the full retraction switch is closed. This indicates that the piston is fully retracted. The load tube light however should flash if there is a power failure. The light should flash unit it is reset. The light should be reset when the cabinet door is opened and closed, and the tube loaded switch is activated, indicating that the product tube has been changed.

Power Up

When the system powers up, the mode it is in should depend on how long the system has been without power. If the power has been out for less than 30 minutes, the power-up mode should be the same as the mode it was in when power when out. If the power has been out for longer than 30 minutes, the unit should power up in the retract mode (thus retracting the piston) and the sold out LED should flash at ½ sec. intervals on the display until a new tube is loaded. Once the full retraction switch is activated, the load tube light will also flash at ½ sec. intervals unit a new tube is loaded. This condition can be distinguished between a current overload situation because both sold out and load tube lights will be flashing when fully retracted. In a current overload situation, the sold to light will be flashing but the load tube light will be on continuously when piston is fully retracted.

Clock Set

The control is equipped with a real time clock that is factor set and manually adjustable. The time is only displayed when manually setting the clock. In order to set the clock, the manual retract switch must be pressed while the piston is in the fully retracted position. Note that the actuator will be disabled during this function. Once the clock set function begins, the double digit seven segment display will display the hour of time. If it is p.m., the right decimal point will be illuminated. To change the hour, press the small draw switch button and release, the hour will increment each time the draw switch is pressed. Once the desired hour is displayed, press the manual retract switch. The hour is now set and the minutes will be displayed. To adjust the minutes, proceed in the same manner as before. When the desired minutes are displayed press the manual retract switch, the time will be set and the control should then exit the clock set function. When the clock set function is used, if not activity on the switches occurs for 20 seconds, the control should exit the clock set function with no changes made to the real time clock. This feature will help to prevent accidental misuse of the clock set function.

Programming Jumpers

The extruder interface board allows for programming jumpers to adjust preload and overload current values. By placing a shorting tab (the same as used on the slush interface board) on a particular jumper location, the preload and overload current setpoints will be adjusted.

The invention has been described with reference to the preferred embodiment. Obviously, modifications and alterations will occur to others upon the reading and understanding of this specification. It is my intention to include all such modifications and alterations insofar as they come within the scope of the appended claims or the equivalence thereof.

Having thus described the invention, I now claim:

1. A valve for use with an operatively associated dispensing apparatus including a source of a fluid product, the valve comprising:

a main body adapted on a first side for engagement with said source of fluid product;

means, in the main body, defining a substantially cylindrical chamber having a concave first end inner wall surface and an open second end;

a first aperture in the main body for fluid communication between the substantially cylindrical chamber and the source of fluid product;

a draw valve reciprocal within said substantially cylindrical chamber along a central longitudinal axis defined by said substantially cylindrical chamber, the draw valve having a convex first end adapted for selective engagement with said concave first end inner wall surface of the substantially cylindrical chamber;

a fluid product pay out aperture formed through the concave first end inner wall surface of the substantially cylindrical chamber for paying out fluid product from the main body, said pay out aperture being located at an angle offset from said central longitudinal axis;

wherein the draw valve includes a biasing means carried therein for limiting the force that can be applied by the draw valve to the convex first end inner wall surface of the substantially cylindrical chamber; and, wherein the fluid draw valve further includes:

a first member defining said convex first end of said draw valve;

a second member adapted for connection to the operatively associated dispensing apparatus; and, said biasing means comprising a compressible member positioned between the first member and the second member, the compressible member controlling the movement of a one of the first and second members relative to the other of the first and second members.

2. The valve according to claim 1 wherein the compressible member is a spring having a predetermined spring constant.

3. A valve for use with an operatively associated dispensing apparatus including a source of a fluid product, the valve comprising:

a main body adapted on a first side for engagement with said source of fluid product;

means, in the main body, defining a substantially cylindrical chamber having a concave first end inner wall surface and an open second end;

a first aperture in the main body for fluid communication between the substantially cylindrical chamber and the source of fluid product;

a draw valve reciprocal within said substantially cylindrical chamber along a central longitudinal axis defined by said substantially cylindrical chamber, the draw valve having a convex first end adapted for selective engagement with said concave first end inner wall surface of the substantially cylindrical chamber;

a fluid product pay out aperture formed through the concave first end inner wall surface of the substantially cylindrical chamber for paying out fluid product from the main body, said pay out aperture being located at an angle offset from said central longitudinal axis;

wherein the draw valve includes a biasing means carried therein for limiting the force that can be applied by the draw valve to the convex first end inner wall surface of the substantially cylindrical chamber; and, further wherein the draw valve includes a first component that defines the first end and a second component that joins therewith to permit actuation of the first component toward and away from the concave first end inner wall surface of the substantially cylindrical chamber with said biasing means comprising a compression spring located within said draw valve between said first and second components.

* * * * *